US007432322B2

(12) United States Patent
Hood

(10) Patent No.: US 7,432,322 B2
(45) Date of Patent: Oct. 7, 2008

(54) COATING COMPOSITION FOR FORMING AN INKJET-PRINTABLE COATING ON A SUBSTRATE

(75) Inventor: David K. Hood, Basking Ridge, NJ (US)

(73) Assignee: ISP Investments Inc., Wilmington, DE (US)

( * ) Notice: Subject to any disclaimer, the term of this patent is extended or adjusted under 35 U.S.C. 154(b) by 463 days.

(21) Appl. No.: 11/207,133

(22) Filed: Aug. 18, 2005

(65) Prior Publication Data

US 2007/0043161 A1 Feb. 22, 2007

(51) Int. Cl.
*C09B 67/00* (2006.01)

(52) U.S. Cl. ....................................... 524/502; 526/264

(58) Field of Classification Search ................. 524/502; 526/264

See application file for complete search history.

(56) References Cited

U.S. PATENT DOCUMENTS

| | | | | |
|---|---|---|---|---|
| 6,541,567 | B1 * | 4/2003 | Riku et al. | 525/70 |
| 6,939,934 | B2 * | 9/2005 | Kopolow et al. | 526/264 |
| 2005/0148186 | A1 * | 7/2005 | Jung et al. | 438/692 |

FOREIGN PATENT DOCUMENTS

| | | | | |
|---|---|---|---|---|
| GB | 1187122 | A | * | 4/1970 |
| WO | WO 2004063287 | A1 | * | 7/2004 |

* cited by examiner

*Primary Examiner*—Bernard Lipman
(74) *Attorney, Agent, or Firm*—William J. Davis

(57) ABSTRACT

A coating composition for forming an inkjet-printable coating on a substrate is provided herein. The composition includes a cationic polymer, and an anionic polymer salt, preferably maleic anhydride/methyl vinyl ether salt (Ca/Na), e.g. GANTREZ® MS-955 (ISP). The coated substrates herein form ink images which are glossy and dry rapidly.

16 Claims, No Drawings

COATING COMPOSITION FOR FORMING AN INKJET-PRINTABLE COATING ON A SUBSTRATE

BACKGROUND OF THE INVENTION

1. Field of the Invention

This invention relates to coating compositions which form inkjet-receptive coatings on a substrate, and, more particularly, to a coating composition which includes both cationic and anionic polymers, and which form ink images which are glossy or satin, and dry rapidly.

2. Description of the Prior Art

The advent of color inkjet printing has been instrumental in fueling the print-on-demand revolution and has also created a number of challenges. Often, the surface of the desired media does not possess the necessary properties for accepting the ink-jet ink. This results in long dry times and/or a poor ink-jet image or light stability. It has long been recognized that a surface treatment or media coating plays a critical role in the final print quality. Numerous media coatings are known in the art. They may contain any number of components and often consist of more than one layer.

Accordingly, it is an object of this invention to provide a coating composition which is particularly suitable for use in surface coating a substrate for use in digital printing, having advantageous print properties.

SUMMARY OF THE INVENTION

What is described herein is a coating composition for forming inkjet-printable coating on a substrate, which images are glossy or satin, and dry rapidly, comprising:

(a) a cationic polymer, (b) an anionic polymer salt, and (c) water.

Preferably, the cationic polymer (a) is a crosslinkable polymer comprising lactam groups, e.g. VIVIPRINT™ 200 (ISP) which is a quaternized terpolymer of vinylcaprolactam (VCL)/dimethylaminopropyl methacrylamide (DMAPMA) and hydroxyethyl methacrylate (HEMA).

Preferably, (b) is the Ca/Na salt of maleic anhydride/methyl vinyl ether, e.g. GANTREZ® MS-955 (ISP).

Preferably, the composition also contains a crosslinker.

Suitably, the substrate is paper, textile, vinyl plastics, polyester and other synthetic film bases.

DETAILED DESCRIPTION OF THE INVENTION

In the composition of the present invention, the cationic polymer (a) can comprise tertiary amino groups and/or hydroxyl groups. Preferably, (a) is a crosslinkable polymer of a vinyl lactam/dimethylaminopropyl methacrylamide/hydroxyethyl methacrylate terpolymer. The vinyl lactam can be a vinyl caprolactam. A particularly preferred example of such a cationic polymer is the resin VIVIPRINT™ 200 manufactured by International Specialty Products (ISP). Such terpolymer preferably comprises vinyl caprolactam (VCL), dimethylaminopropyl methacrylamide (DMAPMA) and hydroxyethyl methacrylate (HEMA), uncrosslinked or crosslinked, unquaternized or quaternized, preferably quaternized and crosslinked. Suitable quaternizing agents include HCl and $H_2SO_4$. Suitably, the terpolymer comprises, by wt., 60-90% VCL, 10-30% DMAPMA and 2-10% HEMA, preferably 75-80% VCL, 13-16% DMAPMA and 4-6% HEMA.

The terpolymer suitably has a molecular weight of about 500,000 to about 1,500,000, preferably about 500,000 to about 1,000,000.

The cationic polymer suitably can be present in an amount by weight, of about 1 to about 98%, and, preferably, for VIVIPRINT™ 200, about 40 to about 80%, and, more preferably, of about 50 to about 75%, of the composition.

The anionic polymer salt (b) preferably is the Ca/Na salt of maleic anhydride/methyl vinyl ether, e.g. GANTREZ® MS-955 (ISP). Suitably (b) is present in the composition in an amount, by weight, of 2 to 40%, preferably 3 to 30%, of the composition.

The coating composition of the present invention can also include a crosslinking agent (crosslinker). The crosslinker suitably can be a polyfunctional aziridine resin, a polyfunctional epoxide, glyoxal, an ammonium zirconium carbonate (AZC), zinc oxide, or melamine/formaldehydes. Particularly preferred crosslinking agents are aziridines, epoxides, oxides of zinc, and melamine/formaldehyde. The crosslinking agent usually is present in an amount by weight, of about 0.1 to about 10% of the composition.

In the photographic papers of the invention, the layer derived from the composition as defined in the present invention can be obtained by applying the coating composition to the substrate base or the coated substrate and allowing the composition to dry. The layer derived from the composition is glossy. For example, calendared bases coated with the composition of the invention can obtain a gloss of 80% or more at 60° according to BYK gloss meter test, and more preferably, 90% or more at 60°. The coating derived from the composition suitably can be present on the substrate base in an amount of about 2 to 20 g/m$^2$, and, preferably, in an amount of about 4 to 12 g/m$^2$. The coated photographic paper has a dry time of less than 6 minutes, and, preferably, of about 30 seconds to 5 minutes, on an inkjet printer.

In the processes of the present invention, the base paper can be submitted to a starch treatment before applying to the base paper a base layer or a layer derived from the composition of the invention. Such a treatment can be carried out by using a surface starch in water together with an optical brightening agent which can be selected among calcium carbonate and titanium dioxide. The step comprising the application of a base layer can be carried out on a mil or cast coater and only one side of the base paper is coated with the base layer. Alternatively, this step can be carried out on a mil coater and both sides of the base paper are coated with the base layer. The base layer can comprise calcium carbonate, fine clays, silicates, titanates and/or delaminated clays. The base layer can comprise a binder selected from the group consisting of styrene butadiene rubber, styrene acrylates, polyvinyl alcohols, polyvinyl chloride and starches. The base layer can be present on at least one side of the base paper or on both sides of the paper.

The crosslinker hardens the polymeric composition to varying levels depending on their addition rates. The crosslinker can be added to the composition just prior to use such that the viscosity increase experienced upon its addition is kept to a minimum.

The processes of the present invention are particularly useful for preparing the surface of photographic papers.

The invention will now be described by particular reference to the following examples.

EXAMPLE 1

A coating composition was prepared by adding ANCAREZ® AR550 (a 55% solids epoxy resin dispersion commercially avilable from Air Products, Inc.)(crosslinker) directly to water. EMULSION® A-35-SP (a35 % wax commercially available from ChemCor)was then added. AQUAZOL® 200 (binder) (polyoxazoline) was added and mixed. VIVIPRINT™ 200 (cationic polymer) was added and stirred till thoroughly mixed. SURFYNOL® 440 (a surfactant commercially available from Air Products, Inc.) was added to the mixture and finally GANTREZ® MS-955 (anionic polymer salt) was added and thoroughly mixed.

A specific example of this procedure is as follows:

Step 1: Add 350 g of water to a 2 L beaker.

2: Add 7.5 g of ANCAREZ® AR550 (55% solids) (Air Products). Mix thoroughly.

3: Add 7.5 g of EMULSION® A-35-SP (35% solids) (ChemCor). Mix thoroughly.

4: Add 50 g of AQUAZOL® 200 (ISP/PCI) (30% solids in water). Mix thoroughly.

5: Add 150 g of VIVIPRINT® 200 (ISP) (30% solids in water). Mix thoroughly.

6: Add 0.5 g of SURFYNOL® 440 (Air Products). Mix thoroughly.

7: Add 200 g of GANTREZ® MS-955 (ISP) (10% solids in water). Mix thoroughly.

The thus-prepared coating composition is given in Table 1 below.

TABLE 1

| Ingredient | Mass (g) | Solids (g) | Wt. % in Composition |
|---|---|---|---|
| Water | 350 | | |
| ANCAREZ ® AR550( 55%) | 7.5 | 4.1 | 4.7 |
| EMULSION A-35-SP (35%) | 7.5 | 2.6 | 3.0 |
| AQUAZOL ® 200 (30%) | 50 | 15 | 17.2 |
| VIVIPRINT ™ 200 (30%) | 150 | 45 | 51.7 |
| SURFYNOL ® 440 | 0.5 | | |
| GANTREZ ® MS-955 (10%) | 200 | 20 | 23.0 |

The coating composition was coated on Mead Westvaco Mark V paper on a coating machine using a #30 Meyer rod, with three zone air oven drying and IR heating. Good heating was used to activate the crosslinker. The coating weight was ~4 g.

The thus-coated paper was printed with an HP inkjet printer. A glossy print was obtained. The measured gloss was ~80 at 60° (BYK gloss meter). The dry time was excellent as well as print quality, print integrity, smudge resistance, adhesion and water resistance.

EXAMPLE 2

A coating composition was prepared by adding ANCAREZ® AR550crosslinker directly to water. A-35-SP was then added. AQUAZOL® 200 was added and mixed. VIVIPRINT™ 200 was added and stirred till thoroughly mixed. SURFYNL 440 was added to the mixture and thoroughly mixed. Finally, GANTREZ MS-955 was added to the system. Once thoroughly mixed, the system was coated on a coating machine using a #40 Meyer rod, with three zone air oven drying and IR heating. Good heating was required to activate the crosslinker. The approximate coating weight was ~12 g. The measured gloss was ~80 at 60° (BYK gloss meter).

A specific example of this procedure is as follows:

Step 1: Add 698 g of water to a 2 L beaker.

2: Add 15 g of ANCAREZ AR550 (55% solids) (Air Products). Mix thoroughly.

3: Add 1 g of A-35-SP (35% solids) (ChemCor). Mix thoroughly.

4: Add 196 g of AQUAZOL 200 (ISP/PCI) (30% solids in water). Mix thoroughly.

5: Add 294 g of VIVIPRINT 200 (ISP) (30% solids in water). Mix thoroughly.

6: Add 0.8 g of SURFYNOL 440 (Air Products). Mix thoroughly.

7: Add 9 g of GANTREZ MS-955 (ISP) (10% solids in water). Mix thoroughly.

The composition of the thus-prepared coating composition is given in Table 2 below.

TABLE 2

| Ingredient | Mass (g) | Solids (g) | Wt. % in Composition |
|---|---|---|---|
| Water | 698 | | |
| ANCAREZ ® AR550 (55%) | 15 | 8.25 | 5.1 |
| A-35-SP (35%) | 1 | 0.3 | 0.3 |
| AQUAZOL ® 200 (30%) | 196 | 58.8 | 36.1 |
| VIVIPRINT ™ 200 (30%) | 294 | 88.2 | 56.5 |
| SURFYNOL ® 440 | 0.8 | 0.8 | 0.5 |
| GANTREZ ® MS-955 | 9 | 6.7 | 43 |

The test results upon coating onto paper and inkjet printing were similar to Example 1.

EXAMPLE 3

Another coating composition of the invention is given in Table 3 below.

TABLE 3

| Ingredient | Mass (g) | Solids (g) | Wt. % in Composition |
|---|---|---|---|
| Water | 700 | | |
| Sodium Tetraborate | 30 | 30 | 16.6 |
| AQUAZOL ® 200 (30%) | 100 | 30 | 16.6 |
| VIVIPRINT ™ 200 (30%) | 300 | 90 | 50.0 |
| SURFYNOL ® 440 | 1 | 1 | 0.6 |
| GANTREZ ® MS-955 (10%) | 80 | 8 | 4.4 |
| CYCAT ® 4040 (40%) | 4 | 1.6 | 0.9 |
| BERSET ® 2506 (70%) | 28 | 19.6 | 10.9 |

The thus-prepared coating composition had a viscosity of ~63.4 cPs (#63, 70 rpm); its percent solids was ~15%. The measured gloss was ~60 at 60° (BYK gloss meter).

The coating resistance to water of this composition was improved by the presence of CYCAT® 4040 (a 40% solids solution of paratoluene sulfonic acid available from Cytec Industries) and BERSET® 2506 (a melamine based resin commercially available from Bercen, Inc.)as crosslinkers, and the inclusion of sodium tetraborate as an added salt. Other test results were similar to Example 1.

EXAMPLE 4

A coating solution was prepared by blending water, barium sulfate and titanium dioxide. In a separate vessel, water, Aquazol® 200, ViviPrint™ 200, and Surfynol® 440 were mixed, and added to the pigment mix. Finally, Gantrez® MS-955 was gently added and thoroughly mixed. Then Cycat® 4040 followed by Berset® 2506 were added. Good heating was used to activate the crosslinkers. The coating weight was ~9 g. The measured gloss was 70 at 60° (BYK gloss meter).

A specific example of this procedure is as follows:

Vessel 1

Step 1: Add 100 g of water to a 2 L beaker.

Step 2: Add 1 g of barium sulfate (100% solids) (Barium and Chemicals). Mix thoroughly.

Step 3: Add 2 g of titanium dioxide (100% solids) (Kronas 2160).

Vessel 2

Step 4: Add 75 g of water. Mix thoroughly.

Step 5: Add 25 g of AQUAZOL 200 (ISP/PCI) (30% solids in water). Mix thoroughly.

Step 6: Add 100 g of VIVIPRINT™ 200 (ISP) (30% solids in water). Mix thoroughly.

Step 7: Add 0.25 g of SURFYNOL 440 (Air Products). Mix thoroughly.

Added Vessel 2 to Vessel 1, then add:

Step 8: Add 20 g of GANTREZ MS-955 (ISP) (10% solids in water). Mix thoroughly.

Step 9: Add 1 g of CYCAT 4040 (Cytec). Mix thoroughly.

Step 10: Add 7 g of BERSET 2506 (Bercen). Mix thoroughly.

The composition is shown in Table 4 below.

TABLE 4

| Ingredient | Mass (g) | Solids (g) | Wt. % in Composition |
|---|---|---|---|
| Water | 175 | | |
| Barium Sulfate (100%) | 1 | 1 | 2.1 |
| Titanium Dioxide (100%) | 2 | 2 | 4.2 |
| AQUAZOL ® 200 (30%) | 25 | 7.5 | 15.6 |
| VIVIPRINT ™ 200 (30%) | 100 | 30 | 62.4 |
| SURFYNOL ® 440 | 0.25 | 0.25 | 0.5 |
| GANTREZ ® MS-955 (10%) | 20 | 2 | 4.2 |
| CYCAT ® 4040 (40%) | 1 | 0.4 | 0.8 |
| BERSET ® 2506 (70%) | 7 | 4.9 | 10.2 |

This composition gave similar test results as the composition of Example 1.

While the invention has been described with particular reference to certain embodiments thereof, it will be understood that changes and modifications may be made which are within the skill of the art. Accordingly, it is intended to be bound only by the following claims, in which:

What is claimed is:

1. A coating composition for forming a coating on a substrate which is inkjet-printable and which images are glossy or satin, and dry rapidly, comprising:

(a) a cationic, crosslinkable polymer comprising lactam groups, (b) an anionic polymer salt, and (c) water.

2. A coating composition according to claim 1 wherein (a) is a terpolymer of vinylcaprolactam/dimethylaminopropyl methacrylamide/hydroxymethyl methacrylate (VCL/DMAPMA/HEMA).

3. A coating composition according to claim 2 wherein said terpolymer comprises, by wt., 60-90% VCL, 10-30% DMAPMA, and 2-10% HEMA.

4. A coating composition according to claim 2 wherein said polymer comprises, by wt. 75-80% VCL, 13-16% DMAPMA and 4-6% HEMA.

5. A coating composition according to claim 2 wherein said terpolymer is quaternized.

6. A coating composition according to claim 1 wherein (b) is a copolymer of the Ca/Na salt of maleic anhydride.

7. A coating composition according to claim 6 wherein said copolymer is maleic anhydride/methyl vinyl ether.

8. A coating composition according to claim 1 which includes a crosslinker.

9. A coating composition according to claim 8 wherein said crosslinker is a polyfunctional aziridine, a polyfunctional epoxide, melamine/formaldehydes, oxides of zinc, glyoxal and/or ammonium zirconium carbonate.

10. A coating composition according to claim 1 wherein (a) comprises, by weight, 1 to 98% of the composition.

11. A coating composition according to claim 10 wherein (a) comprises, by weight, 40 to 80%.

12. A coating composition according to claim 11 wherein (a) comprises 50 to 75%.

13. A coating composition according to claim 1 wherein (b) comprises, by weight, 2 to 40% of the composition.

14. A coating composition according to claim 13 wherein (b) comprises 3 to 30%.

15. A substrate coated with the composition of claim 1.

16. A substrate coated with the composition of claim 1 wherein the substrate is paper, textile, polyester or vinyl plastic.

* * * * *